Jan. 3, 1956  T. L. BEACH, JR  2,729,142
SHOCK RESISTANT REARVIEW MIRROR
Filed Feb. 23, 1952
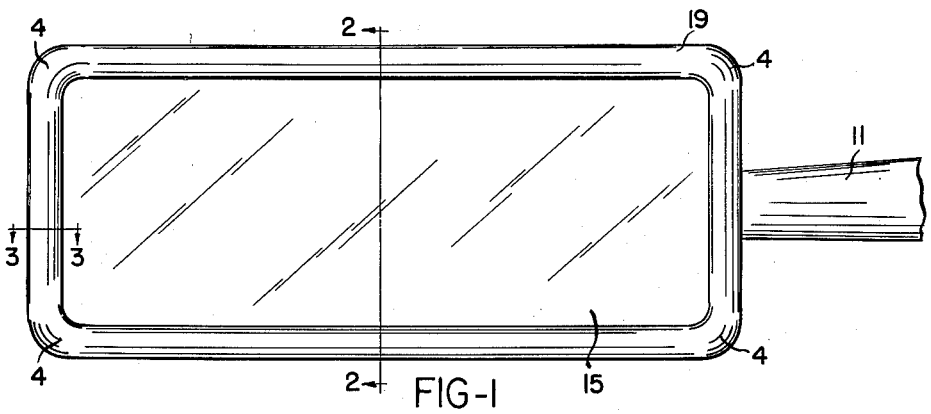
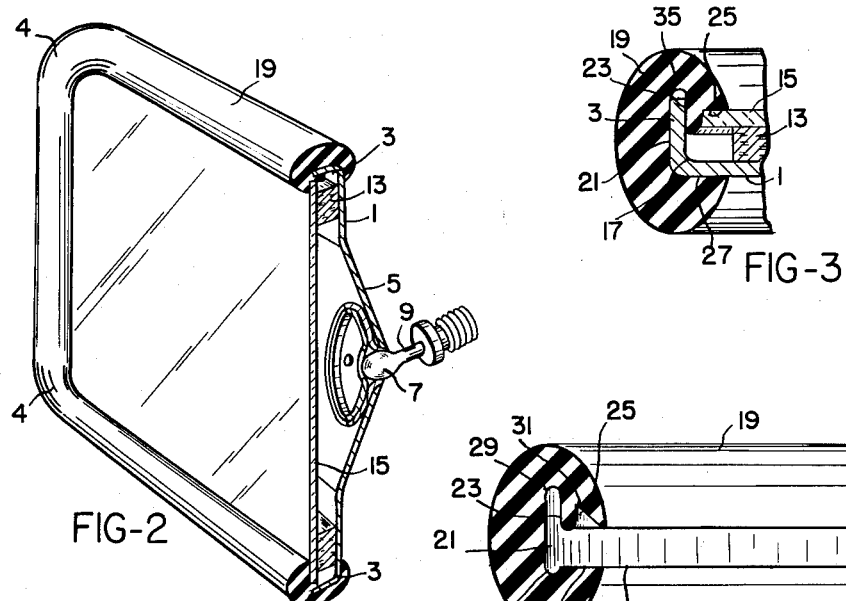
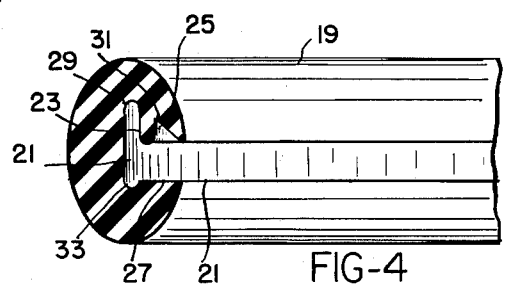
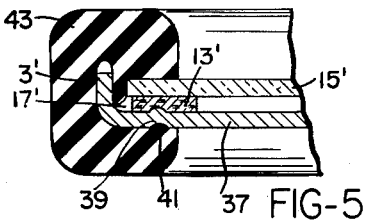
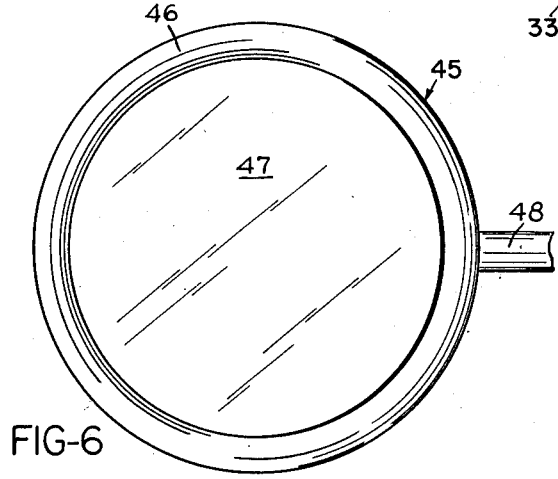
INVENTOR
THEODORE L. BEACH JR.
BY *Toulmin & Toulmin*
ATTORNEYS

United States Patent Office 2,729,142
Patented Jan. 3, 1956

2,729,142

SHOCK RESISTANT REARVIEW MIRROR

Theodore L. Beach, Jr., Donnelsville, Ohio

Application February 23, 1952, Serial No. 272,931

7 Claims. (Cl. 88—96)

This invention relates to improved shock resistant mirrors, and more particularly to rear view mirrors for vehicles.

It is a primary object of the present invention to provide an improved shock resistant mirror wherein the reflecting glass is resiliently supported and does not contact rigid frame means.

It is an important object of this invention to provide an improved shock resistant mirror having a minimum number of cooperating elements which may be secured together in a rigid unit and wherein the elements are readily separable upon application of a slight stress to a selected one of them.

It is a particular object of this invention to provide an improved shock resistant mirror in the structure of which the reflecting glass mirror has a reduced overall surface area without sacrificing viewing area.

These and other allied objects are attained by providing a flanged backing member within which a glass mirror is so positioned as to define with the flange a peripheral spacing into which there extends a peripheral rib of a resilient collar, which collar securely holds the flanged backing member and reflecting mirror in a fixed relation.

The invention will be more fully understood by reference to the following detailed description and accompanying drawings wherein:

Figure 1 is a front view of my improved mirror;

Figure 2 is a perspective view of the mirror taken on line 2—2 of Figure 1 in the direction of the arrows;

Figure 3 is a sectional view of my improved mirror taken on line 3—3 of Figure 1;

Figure 4 is a view of a portion of the resilient collar illustrating the peripheral rib thereof;

Figure 5 illustrates a modification of the structure shown in the preceding figures; and Figure 6 is a view illustrating the structure of invention embodied in a mirror of curvilinear shape.

Referring to the drawings, there is shown in Figures 1, 2 and 3 a rear view mirror having a backing member 1 of sheet metal provided with an integral upstanding flange 3 on the forward side thereof and having rounded corners as at 4. On the rear side of backing member 1 there is a protuberant central portion 5 which comprises a ball and socket arrangement 7 from which extends a pin 9 adapted to be secured to a support arm 11 which in turn may be secured to any convenient portion of the framework of a vehicle.

A cork gasket 13 is positioned within the flanged backing member 1, and a mirror 15 placed thereover defines with the flange 3 a peripheral spacing 17 (Figure 3). The mirror 15 is smaller in perimeter than the backing member 1 and the flange 3, and when in position in the backing member 1 the mirror edge is wholly out of contact with the flange 3. For securely holding the flanged backing member 1 and the mirror 15 in fixed relation there is provided an encircling collar 19 of resilient material which is preferably of a soft rubber composition capable of being stretched slightly for securing over the backing member 1, flange 3 and mirror 15. As most clearly shown in Figures 3 and 4 this collar 19 is provided with an internal channel 21 into which extends an internal peripheral rib 23. Rib 23 in the engaged position of the collar 19 (Figure 3) extends into the peripheral spacing 17 eliminating the possibility of contact between mirror 15 and metal flange 3.

As also shown in Figure 3 collar 19 has lip portions 25 and 27 which respectively engage a peripheral portion of mirror 15 and a smooth peripheral portion of the rear of the backing member 1; thus the collar envelops the flange and a marginal portion of the mirror thereby providing for a firm compressive engagement of the elements of the unit. Collar 19 is itself held against movement under ordinary service conditions by the forces induced by the slightly stretched member and the resilient engagement of the rib 23 with the external periphery of member 15 and the internal periphery of flange 3. However, the application of a directional force or torsional twist to the collar 19 on the outer wall of lips 25 and 27 is sufficient to render the components readily disengageable. Preferably the collar 19 is form relieved at 29, 31 and 33 and the flange 3 may be slightly rounded as at 35 in order to avoid cutting of the resilient material and to assist in the mounting of the collar over the flange.

Preferably also the surface of the lip 25 forms a slight convenient acute angle with the peripheral rib 23 as may be most clearly seen from Figure 4 wherein the angular relation has been emphasized to clearly illustrate the relationship. With this arrangement when the surface of lip 25 compressively engages the mirror 15 the rib 23 is biased slightly towards mirror 15 and insures of firm engagement therewith.

The surface of lip 27 may also be tapered very slightly downwardly to the left towards the channel 21 (Figure 4) as desired, thus insuring ease of mounting of collar 19 together with adequate pressure of the collar on the backing member 1.

Referring to Figure 5 there is shown a further embodiment in which the metal backing member 37, otherwise similar to backing member 1, is provided with a peripheral recess indicated at 39 and into which recess there extends a protuberant peripheral portion 41 of collar 43, which collar is otherwise similar to collar 19. Thus cork gasket 13' is positioned within the flanged backing member 37 and mirror 15' placed thereover defines with the flange 3' a peripheral spacing 17'

Figure 6 indicates an embodiment in which the mirror designated generally at 45 is circular in contrast to the rectangular structure of the preceding figures. In this arrangement a collar 46 of resilient material encircles mirror 47, similarly to the arrangement of collar 19 and mirror 15 shown in Figure 1. A support arm 48 similar to support arm 11 extends from the backing (not shown) of the member 45.

While I prefer to employ the device as shown in the drawing with the rib 23 having a length such that when collar 19 is engaged the rib will provide a firm mating surface for the glass edge, it is to be understood that the invention is not limited to such a detailed arrangement since it is clear that the rib length is not otherwise critical and is limited only by the ease of mounting desired in the application of the collar to the flanged backing and mirror assembly.

It will be understood that this invention is suceptible to modification in order to adopt it to different usages and conditions and accordingly, it is desired to comprehend such modificatiaons within this invention as may fall within the scope of the appended claims.

I claim:

1. In a shock resistant mirror the combination of an assembly comprising a backing member having an upstanding flange, a mirror positioned in the backing member and having the mirror edge portion defining a spacing with the flange, said flange being wholly out of contact with the said mirror edge portion, and a channeled resilient collar having an integral internal rib thereof extending into said spacing engaging the mirror edge portion, said collar enveloping the flange and a marginal portion of the mirror surface and compressively engaging said backing member and mirror.

2. In a shock resistant mirror the structure comprising a backing member having an upstanding flange about the perimeter thereof, a mirror positioned within said flange and defining with the interior side of the flange a peripheral spacing, the mirror edge being wholly out of contact with the flange and a channeled resilient collar having an integral internal peripheral rib thereof extending into said spacing engaging the mirror edge and the interior side of the flange, said collar encircling said flange and securing said mirror and backing member in compressive relation.

3. In a shock resistant mirror the structure comprising a backing member having an upstanding flange about the perimeter thereof, a mirror, smaller in perimeter than the backing member, positioned within said flange and having the edge thereof defining with the flange a peripheral spacing, the mirror edge being wholly out of contact with the flange, and a channeled resilient collar having an integral internal peripheral rib thereof extending into said spacing engaging said flange and mirror edge, said rib terminating in the spacing laterally of the glass, said collar enveloping said flange and having a lip portion of the collar adjacent the said rib compressively engaging a peripheral surface of the mirror to retain said mirror and said backing member in compressive relation.

4. In a shock resistant mirror the structure comprising a backing member having an upstanding flange about the perimeter thereof, a mirror, smaller in perimeter than the backing member, positioned within said flange and having the edge thereof defining with the flange a peripheral spacing, the mirror edge being wholly out of contact with the flange, and a channeled resilient collar having an integral internal peripheral rib thereof extending into and terminating within said spacing engaging said flange and mirror edge, said collar enveloping said flange and also having opposed peripheral lip portions compressively engaging the mirror and backing member therebetween.

5. In a shock resistant mirror the structure comprising a backing member having an upstanding flange about the perimeter thereof, a mirror, smaller in perimeter than the backing member, positioned within said flange and having the edge of the mirror defining with the flange a peripheral spacing, the mirror edge being wholly out of contact with the flange, a channeled resilient collar encircling said flange and having an internal peripheral rib thereof extending into said spacing engaging the mirror edge and flange, and a lip portion of said collar extending therefrom at the internal rib and forming an acute angle with the latter, said lip portion compressively engaging the peripheral surface of the mirror and biasing said rib toward said mirror.

6. In a shock resistant mirror the structure comprising a backing member having an upstanding flange about the perimeter thereof, a mirror of smaller perimeter than the backing member, positioned within said flange and defining therewith a peripheral spacing, the edge portion of the mirror being wholly out of contact with the flange, and a channeled resilient collar having an internal peripheral rib thereof extending into said spacing and engaging the edge portion of the mirror, the said collar enclosing the outer periphery of said flange and having a peripheral lip extending compressively over a peripheral portion of the surface of said mirror, the said lip and rib together forming an acute angle, the compression of the lip on the mirror surface biasing the rib toward the mirror edge.

7. In a shock resistant mirror the structure comprising a backing member having a peripheral recess on the underside thereof and an upstanding flange about the perimeter of the upper side thereof, a mirror smaller in perimeter than the backing member, positioned within said flange and having the edge thereof defining with the flange a peripheral spacing, the mirror edge being wholly out of contact with the flange and a channeled resilient collar having an internal rib thereof extending into said spacing engaging said flange and mirror edge, said collar compressively enclosing the peripheries of said flange, said mirror and said backing member, and said collar having a lower lip having a peripheral protuberance engaging in said peripheral recess of said backing member.

References Cited in the file of this patent

UNITED STATES PATENTS

| | | |
|---|---|---|
| 1,327,865 | Flaxbaum | Jan. 13, 1920 |
| 1,876,319 | Smith | Sept. 6, 1932 |
| 1,893,245 | Ritz-Woller | Jan. 3, 1933 |
| 2,095,657 | Burgess | Oct. 12, 1937 |
| 2,111,641 | Ritz-Woller | Mar. 22, 1938 |
| 2,112,316 | Turner | Mar. 29, 1938 |
| 2,121,099 | Putterman | June 21, 1938 |
| 2,495,347 | Ritz-Woller | Jan. 24, 1950 |
| 2,502,699 | Budreck | Apr. 4, 1950 |
| 2,579,148 | Jones | Dec. 18, 1951 |